United States Patent [19]

Moore

[11] Patent Number: 4,584,966
[45] Date of Patent: Apr. 29, 1986

[54] LIVESTOCK WATERING SYSTEM

[76] Inventor: James G. Moore, 911 Timberdell, Norman, Okla. 73069

[21] Appl. No.: 718,566

[22] Filed: Apr. 1, 1985

[51] Int. Cl.⁴ ............................................. A01K 7/02
[52] U.S. Cl. ................................... 119/73; 137/236.1
[58] Field of Search .................... 119/73, 74; 137/236, 137/563

[56] References Cited

U.S. PATENT DOCUMENTS

| | | | |
|---|---|---|---|
| 3,221,706 | 12/1965 | Johnson | 119/73 |
| 3,306,263 | 2/1967 | Johnson | 119/73 |
| 3,324,834 | 6/1967 | McKinstry | 119/73 X |
| 4,309,962 | 1/1982 | Boozer | 119/74 |

Primary Examiner—Hugh R. Chamblee

[57] ABSTRACT

An improved livestock watering system is provided which is adapted to selectively circulate water between a reservoir and a drinking basin in response to the temperature of the water in the drinking basin so as to prevent water in the drinking basin from freezing during low temperature conditions, and to cool the water in the drinking basin during high temperature conditions. The livestock watering system comprises a housing, a drinking basin supported by the housing, a reservoir disposed within the ground so as to be positioned below the frostline of the ground, and a water circulation assembly for selectively circulating water between the reservoir and the drinking basin. A flow control valve, disposed in a lower portion of the drinking basin, is connected to a pressurized water source such that a substantially constant level of water is maintained in the drinking basin. A temperature sensing assembly adapted to sense the temperature of the water in the drinking basin is operably connected to the water circulation assembly such that the water circulation system can be selectively activated between an on mode and an off mode in response to the temperature of the water in the drinking basin.

26 Claims, 8 Drawing Figures

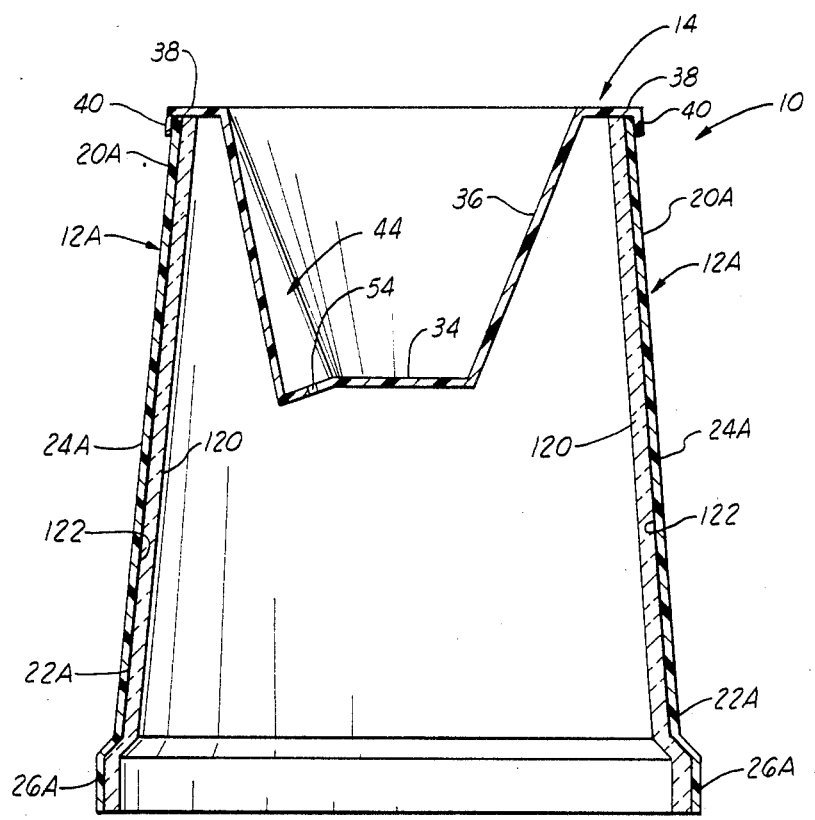
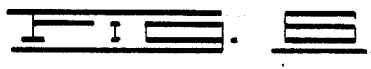
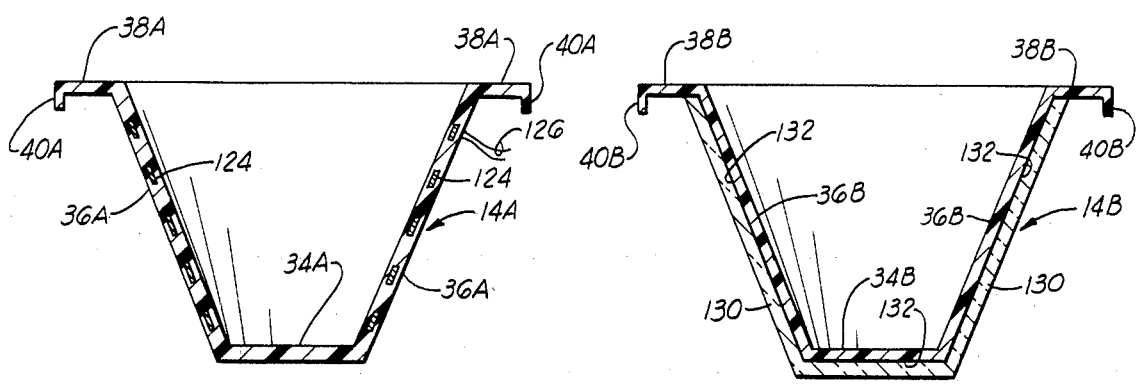

LIVESTOCK WATERING SYSTEM

BACKGROUND OF THE INVENTION

1. Field of the Invention

The present invention relates to a livestock watering system, and more particularly, but not by way of limitation, to a livestock watering system adapted to selectively circulate water in response to the temperature of the water in the drinking basin so as to prevent freezing of the water during low temperature conditions and to cool the water during high temperature conditions.

2. Brief Description of the Prior Art

Providing a fresh supply of water throughout all seasons of the year presents a difficult problem for ranchers and the like. In the winter, when unusually low temperature conditions are encountered, an open supply of water must be maintained for the animals. On the other hand, in the summer, when high temperature conditions are encountered, it is desirable to maintain a fresh, cool supply of water for the animals.

Numerous systems have heretofore been proposed for providing a supply of water to animals, especially during winter weather involving unusually low temperature conditions. Typical of such prior art systems are the recirculating livestock watering system disclosed in U.S. Pat. No. 3,306,263 and the livestock watering station disclosed in U.S. Pat. No. 4,309,962.

While the prior art systems have incorporated various means to control the level of the water in a drinking basin, and/or for recirculating water between a drinking basin and a reservoir to prevent freezing of the water in the drinking basin during the winter, such prior art systems have possessed certain inherent problems in that such systems are expensive to operate due to the energy requirements of constantly circulating the water, and in many instances, such systems do not effectively prevent freezing of the water in the drinking basin when the water is exposed to low temperature conditions. In addition, many of the livestock watering systems heretofore known utilize complex mechanical structures requiring substantial maintenance. Thus, a need has long existed for an improved livestock watering system which is dependable and which eliminates the problems inherent with the prior art watering systems.

SUMMARY OF THE INVENTION

The present invention provides an improved livestock watering system which is capable of preventing water in a drinking basin from freezing during low temperature conditions, and which is capable of cooling water in the drinking basin during high temperature conditions. Broadly, the improved livestock watering system comprises a housing, a drinking basin supported by the housing, a reservoir disposed within the ground so as to be below the frost-line of the ground, and a water circulation assembly for selectively circulating water between the reservoir and the drinking basin. A flow control valve, disposed in a lower portion of the drinking basin, is connected to a pressurized water source such that a substantially constant level of water is maintained in the drinking basin. A temperature sensing assembly adapted to sense the temperature of the water in the drinking basin is operably connected to the water circulation assembly such that the water circulation system can be selectively activated to either an on mode or an off mode in response to the temperature of the water in the drinking basin.

An object of the present invention is to provide an improved livestock watering system.

Another object of the present invention, while achieving the before-stated object, is to provide a livestock watering system capable of preventing water from freezing in the drinking basin during sub-freezing temperature conditions, and which is capable of cooling water in the drinking basin during high temperature conditions.

Another object of the present invention, while achieving each of the before-stated objects, is to provide a livestock watering system which is substantially maintenance free, economical to manufacture, and which does not suffer from the disadvantages of the prior art systems.

Other objects, advantages and features of the present invention will become clear upon reading the following detailed description in conjunction with the drawings and appended claims.

BRIEF DESCRIPTION OF THE DRAWINGS

FIG. 6 is a cross-sectional view of the housing and drinking basin of the improved livestock watering system of the present invention which is similar to that shown in FIG. 4, and illustrating insulation disposed about an interior surface of a housing.

FIG. 7 is a cross-sectional view of an alternative embodiment of the drinking basin of the improved watering system of the present invention wherein heating elements are disposed in the wall portion of the drinking basin.

FIG. 8 is a cross-sectional view of yet another embodiment of the drinking basin of the improved watering system of the present invention wherein insulation is disposed about the drinking basin.

DETAILED DESCRIPTION

Figure 1:
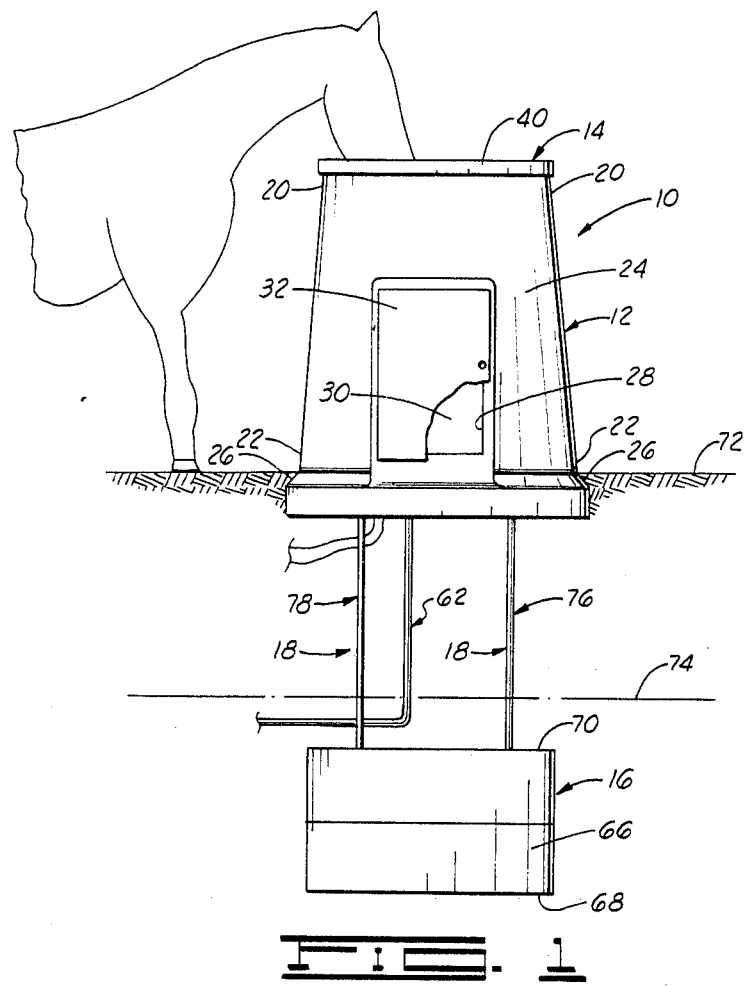
FIG. 1 is a partially broken, semi-schematical, elevational view of the improved livestock watering system of the present invention.

Referring to the drawings, and more particularly to FIGS. 1 through 5, an improved livestock watering system 10 of the present invention is illustrated. The livestock watering system 10 comprises a housing 12, a drinking basin 14, a reservoir 16, and a water circulation assembly 18 adapted to selectively circulate water between the drinking basin 14 and the reservoir 16 in response to the temperature of the water in the drinking basin 14. The housing 12, illustrated as substantially cylindrical in cross-section, is provided with an upper end portion 20, a lower end portion 22 and a substantially continuous sidewall 24. The diameter of the lower end portion 22 of the housing 12 is greater than the diameter of the upper end portion 20. Thus, the continuous sidewall 24 of the housing 12 is inclined outwardly from the upper end portion 20 of the housing 12 to the lower end portion 22 of the housing 12 substantially as shown. A shoulder 26 is formed about the lower end portion 22 of the housing 12. The shoulder 26, which is desirably buried in the ground, provides a means for anchoring the housing 12 of the livestock watering system 10 in a stable, stationary position with relation to the reservoir 16.

Figure 2:
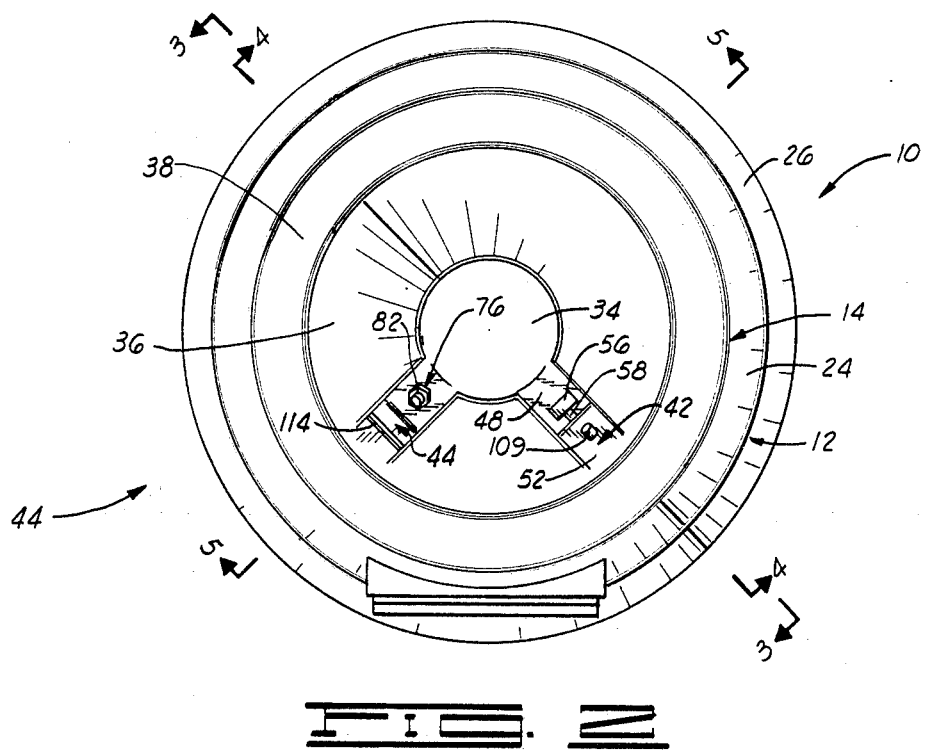
FIG. 2 is a top plan view of the improved livestock watering system of the present invention.

An access opening 28 (shown in FIG. 1) is provided in the continuous sidewall 24 of the housing 12 so that access is available to a hollow interior portion 30 of the housing 12 for servicing components of the water circulation assembly 18 disposed in the housing 12 of the livestock watering system 10. A door 32 is connected to the continuous sidewall 24 of the housing 12 such that the door 32 is movable between a closed, locked position (wherein the door 32 seals the access opening 28 as illustrated in FIGS. 1 and 2), and an open position (not shown) for permitting access to the interior portion 30 of the housing 12 via the access opening 28. Any suitable means, such as hinges and screws, can be used to connect the door 32 to the continuous sidewall 24 of the housing 12.

As shown in FIGS. 2-6, the drinking basin 14 of the livestock watering system 10 is an inverted, substantially frustum-shaped basin having a closed bottom member 34, a continuous sidewall 36 and an annular rim 38 which defines a lip 40. The drinking basin 14 is positioned within the housing 12 such that the annular rim 38 of the drinking basin 14 engages and is supported by the upper end portion 20 of the housing 12, and the lip 40 of the drinking basin 14 is disposed substantially adjacent to and encircles the upper end portion 20 of the housing 12 substantially as shown. The drinking basin 14 can be secured to the housing 12, if desired, by connecting the lip 40 of the drinking basin 14 to the upper end portion 20 of the housing 12 using any suitable means such as adhesives, screws and the like.

The drinking basin 14 further comprises a first fluted recessed portion 42 and a spatially disposed second fluted recessed portion 44. The first and second fluted recessed portions 42, 44 are formed in the sidewall 36 of the drinking basin 14 and extend the length of the sidewall 36 from the annular rim 38 to the bottom member 34 of the drinking basin 14 substantially as shown in FIGS. 4 and 5. To facilitate the positioning of a return flow conduit of the water circulation assembly 18 in the second recessed fluted portion 44, as will be described in more detail hereinafter, the portion of the bottom member 34 of the drinking basin 14 forming the bottom portion of the second fluted recessed portion 44 is desirably angularly disposed so as to be positioned below the remaining portion of the bottom member 34 substantially as shown in FIGS. 3 and 5.

The first fluted recessed portion 42 of the drinking basin 14, is provided with a first aperture 46 in a lower portion 48 thereof, and a second aperture 50 in a medial portion 52 thereof; whereas, the second fluted recessed portion 44 of the drinking basin 14 is provided with an aperture 54 in the portion of the bottom member 34 of the drinking basin 14 forming the base of the second fluted recessed portion 44. A flow control valve 56 having a connecting stem 58 is positioned within the lower portion 48 of the first fluted recessed portion 42 such that the stem 58 of the flow control valve 56 extends through the first aperture 46 of the first fluted recessed portion 42 of the drinking basin 14. The stem 58 is sealed within the first aperture 46 by any suitable means, such as gaskets, fiberglass, epoxy resin materials and the like so that a fluid-tight seal is formed between the stem 58 of the flow control valve 56 and the portion of the sidewall 36 of the drinking basin 14 surrounding the first aperture 46.

Figure 3:
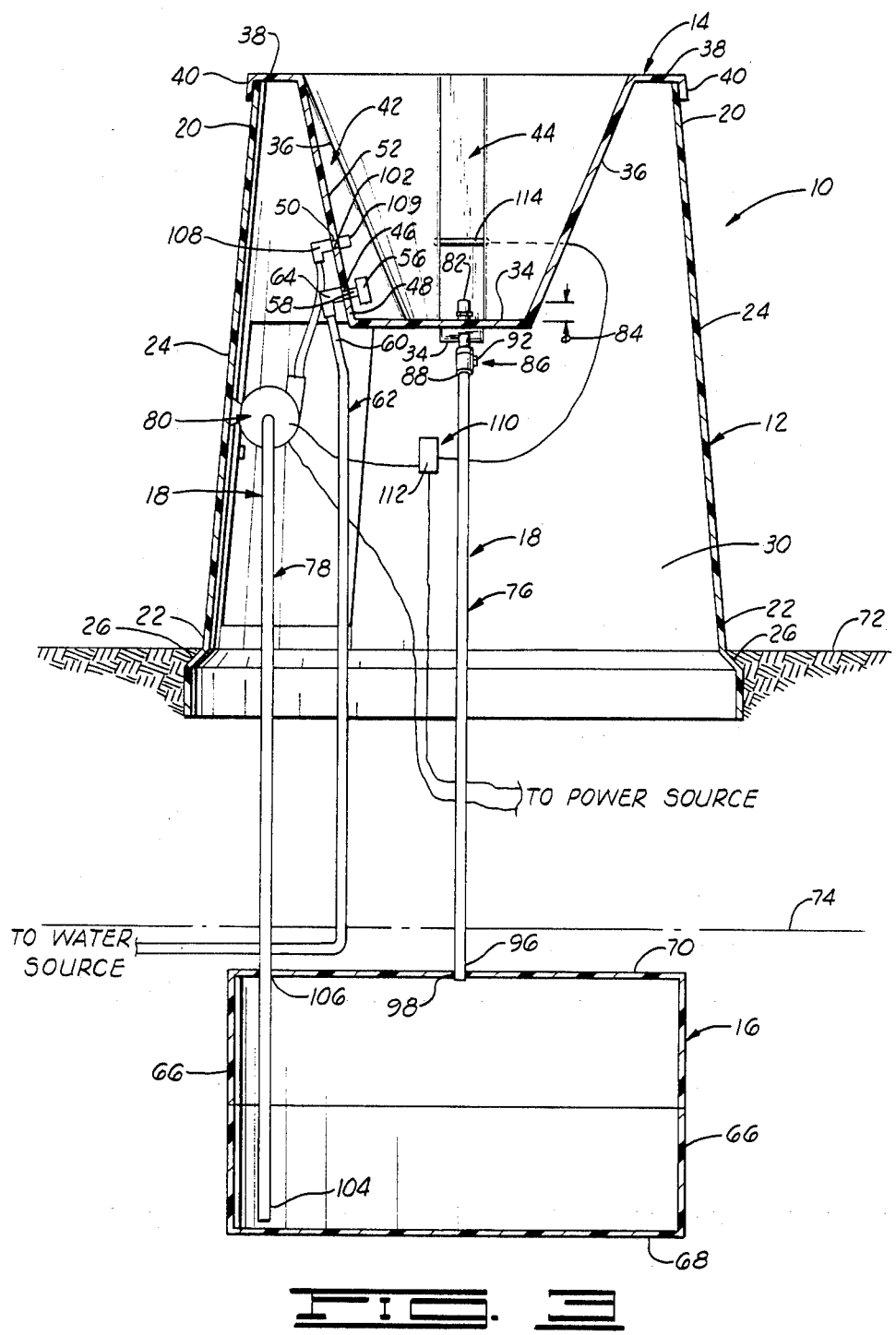
FIG. 3 is a cross-sectional, semi-schematical, elevational view of the improved water system of FIG. 2 taken along the line 3—3.
Figure 4:
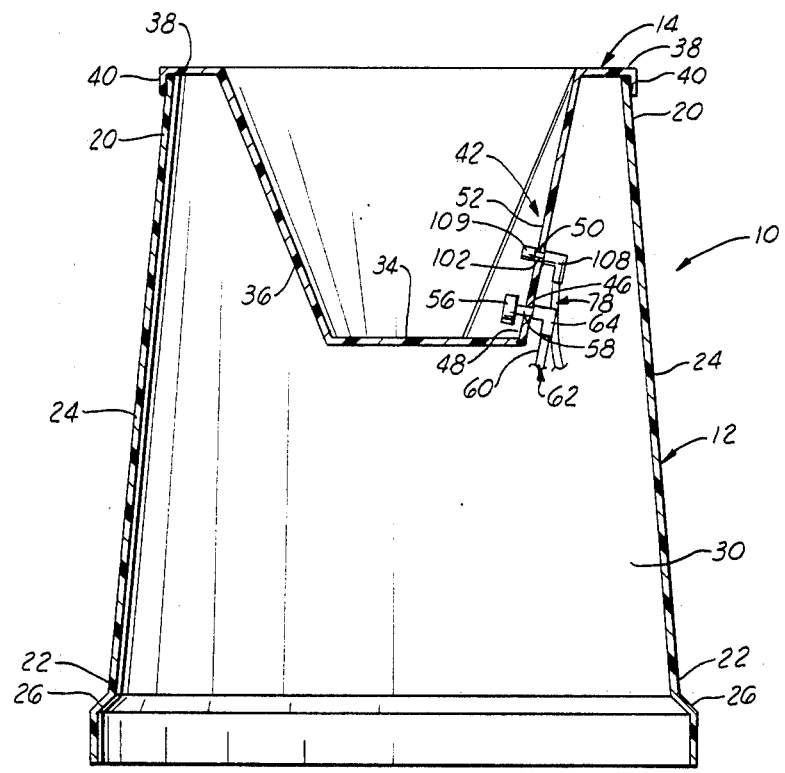
FIG. 4 is a cross-sectional view of the housing and drinking basin of the improved livestock watering system of FIG. 2 taken along the line 4—4.
Figure 5:
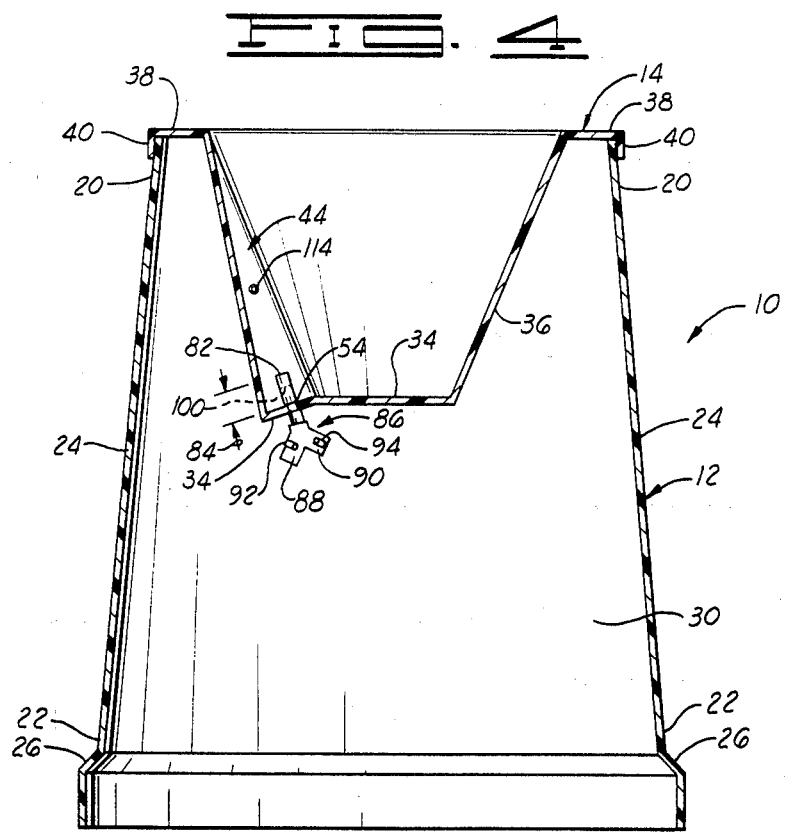
FIG. 5 is a cross-sectional view of the housing and drinking basin of the livestock watering system of FIG. 2 taken along the line 5—5.

Referring more specifically to FIGS. 3 and 4, one end 60 of a pressurized water supply conduit 62 is connected to the stem 58 of the flow control valve 56 so that water can be discharged into the drinking basin 14 via the pressurized water supply conduit 62 when the flow control valve 56 is in an open position. To facilitate the connection between the end 60 of the pressurized conduit 62 and the stem 58 of the flow control valve 56, especially when assembling the livestock watering system 10 in the field, one may desire to interpose a coupling member, such as elbow joint connector 64, between the stem 58 of the flow control valve 56 and at the end 60 of the pressurized water conduit 62 substantially as shown.

Any valve which is activated between an open position and a closed position in response to the amount of water disposed above the valve can be used as the flow control valve 56 of the livestock watering system 10 of the present invention. The use of such a flow control valve insures that a substantially constant level of water is maintained in the drinking basin 14 at all times. While any suitable valve having the before-mentioned features can be used as the flow control valve 56 in the livestock watering system 10 of the present invention, desirable results have been obtained where the flow control valve 56 is a Freeland Free-Flo heavy duty livestock watering valve manufactured by J. H. Industries, Inc. for Freeland Industries, Inc., Portage, Wis. 53901.

Referring now to FIGS. 1 and 3, the reservoir 16 of the livestock watering system 10, illustrated as a hollow, cylindrical-shaped member capable of holding and storing a supply of water, comprises a sidewall 66, a bottom or base plate 68 connected to a lower end of the sidewall 66, and a top or cover plate 70 connected to an upper end of the sidewall 66. The reservoir 16, which is connected to and in fluid communication with the drinking basin 14 via the water circulation assembly 18, is buried below the surface 72 of the ground a sufficient depth so that the reservoir 16 is positioned below a frost-line 74 of the ground in the climate where the livestock watering system 10 is being used. By burying the reservoir 16 below the frost-line 74, water contained in the reservoir 16 will be maintained in a liquid, flowable state even when the water in the drinking basin 14 is exposed to temperatures below freezing. Thus, water from the reservoir 16 can be selectively circulated between the reservoir 16 and the drinking basin 14 via the water circulation system 18 in response to the temperature of the water in the drinking basin 14, as will be more fully described hereinafter. The selective circulation of water between the drinking basin 14 and the reservoir 16 will prevent the water in the drinking basin 14 from freezing, even when exposed to sub-freezing temperatures; and the selective circulation of water between the drinking basin 14 and the reservoir 16 will cool the water in the drinking basin 14, even when exposed to high temperature conditions.

As previously stated, fluid communication is established between the drinking basin 14 and the reservoir 16 of the livestock watering system 10 via the water circulation assembly 18. The water circulation assembly 18 comprises a return flow conduit 76, a water circulation conduit 78 and a pump 80. One end 82 of the return flow conduit 76 is positioned through the aperture 54 in the bottom of the second fluted recessed portion 44 of the drinking basin 14 and sealed therein using conventional sealing material such that a fluid-tight seal is formed between the return flow conduit 76 and the drinking basin 14. Further, the return flow conduit 76 is positioned through the aperture 54 such that the end 82 extends a distance 84 into the second fluted recessed portion 42 of the drinking basin 14 substantially as shown in FIGS. 3 and 5.

To facilitate the assembling of the livestock watering system 10 at a field location, as well as provide a means to selectively drain the water from the drinking basin 14 and, if desirable, the reservoir 16, a Y-shaped coupling member 86 (see FIGS. 3 and 5) is interposed within the return flow conduit 76 at a position below the drinking basin 14 substantially as shown. Two of the leg portions of the Y-shaped coupling member 86, such as leg portions 88 and 90, are provided with stop cock type valves, such as valves 92 and 94 so that water can be selectively channeled from the drinking basin 14 to either the reservoir 16 (when the valve 92 in the leg portion 88 is in an open position and the valve 94 in the leg portion 90 is in a closed position) or drained to an exterior location (when valve 94 in the leg portion 90 is in an open position and the valve 92 in the leg portion 88 is in a closed position). Coupling members, such as the Y-shaped coupling member 86, are well known in the art. Thus, no further comments concerning the connection or operation of such a coupling member is deemed necessary.

In order to complete the path of water flow from the drinking basin 14 to the reservoir 16 via the return flow conduit 76, a second end 96 of the return flow conduit 76 is positioned in an aperture 98 formed in the top or cover plate 70 of the reservoir 16 and sealed therein using conventional sealing materials so that a fluid-tight seal is formed between the second end 96 of the return flow conduit 76 and the cover plate 70 and fluid communication is established therebetween.

To prevent undesirable debris from entering the reservoir 16 from the drinking basin 14 during circulation of water therebetween, a filter element 100 such as a screen mesh material, and shown in phantom in FIG. 5, is secured within the return flow conduit 76 so as to be disposed in close proximity to the end 82 thereof. The filter element 100 will capture foreign materials present in the water of the drinking basin 14 which are incapable of passing through the filter element 100 so that the captured debris can readily be removed, when required, by merely picking the material from the top of the filter element 100 with one's fingers.

One end 102 of the water circulation conduit 78 of the water circulation assembly 18 is positioned through the second aperture 50 in the medial portion 52 of the first fluted recessed portion 42 of the drinking basin 14 and sealed therein, using conventional sealing materials, so that a fluid-tight seal is formed between the water circulation conduit 78 and the drinking basin 14. A second end 104 of the water circulation conduit 78 is positioned through a second aperture 106 formed in the top or cover plate 70 of the reservoir 16 so that the second end 104 of the water circulation 78 extends to a position near the bottom or base plate 68 of the reservoir 16 substantially as shown in FIG. 3. The water circulation conduit 78 is sealed to the cover plate 70 of the reservoir 16 using conventional sealing materials so that a fluid-tight connection is formed therebetween.

To facilitate the assembling of the livestock watering system 10 at a field location, a coupling member, such as elbow joint connector 108, is interposed within the water circulation conduit 78 so that one end of the coupling member is disposed substantially adjacent an exterior portion of the drinking basin 14. Further, as a means for directing the flow of water into the drinking basin 14 from the water circulation conduit 78 as well as to increase the velocity of the water discharged into the drinking basin 14, a nipple or nozzle member 109 is secured to the end 102 of the water circulation conduit 78.

The pump 80 of the water circulation assembly 18, which is positioned within the interior portion 30 of the housing 12 and mounted to the sidewall 24 of the housing 12 by any suitable means, such as screws, bolts and the like, is operably connected to the water circulation conduit 78 so that the pump 80 and the water circulation conduit 76 are in fluid communication. Thus, upon activation of the pump 80 water is pumped from the reservoir 16 to the drinking basin 14 via the water circulation conduit 76 and the pump 80.

Referring now to FIG. 3, the pump 80, which is characterized as having an on mode and an off mode, is connected in series to an external power source, (not shown) via a temperature sensing assembly 110 in a conventional manner such that the pump 80 can be selectively activated between the on mode and the off mode in response to the temperature sensing asembly 110. Any suitable commercially available pump can be used as the pump 80 in the water circulation assembly 18 of the livestock watering system 10. However, desirable results have been obtained when the pump 80 is a Teel, open air, submergible pump Model 1P805A distributed by Dayton Electric Manufacturing Co., Chicago, Ill.

The temperature sensing assembly 110, which is adapted to sense the temperature of the water in the drinking basin 14 and activate the pump to one of the on or off modes in response to the temperature of the water, comprises a thermostat 112 having a temperature sensing element or probe 114 operably connected to the thermostat 112. The thermostat 112 is mounted in a convenient location within the interior portion 30 of the housing 12, such as on the interior side of the door 32, so that one can have ready access to the thermostat 112 for adjusting the operating range of the thermostat 112. The temperature sensing probe 114 of the thermostat 112 is positioned within the drinking basin 14 so as to be in contact with the water in the drinking basin 14. The temperature sensing probe 114 is adapted to sense the temperature of the water in the drinking basin 14 and sends a signal representative of the sensed temperature to the thermostat 112. When the sensed temperature is determined to be at predetermined value, the thermostat 112 selectively activates the pump 80 of the water circulation assembly 18 to the on mode so that water is circulated between the drinking basin 14 and the reservoir 16. When the temperature in the drinking basin 14 has again reached a predetermined temperature, as sensed by the temperature sensing probe 114, the thermostat 112 will send a signal to the pump 80 to switch the pump 80 to the off mode so that circulation of water between the drinking basin 14 and the reservoir 16 is halted. Thus, the serial connection of the thermostat 112 and the pump 80 allows one to selectively circulate water between the drinking basin 14 and the reservoir 16 when low temperature conditions are encountered to prevent the water from freezing in the drinking basin 14, and to selectively circulate water between the drinking basin 14 and the reservoir 16 when high temperature conditions are encountered to effectively cool the water in the drinking basin 14.

Any suitable thermostat having a temperature sensing probe and capable of selectively switching the pump 80 between the on mode and off mode, and desirably having an adjustable differential, can be used as the temperature sensing assembly 110 of the livestock watering system 10 of the present invention. Further, if one desires to selectively circulate water between the drinking basin 14 and the reservoir 16 at two different temperature settings (i.e. when the temperature of the water in the drinking basin 14 falls to 30 degrees Fahrenheit, or when the temperature of the water reaches 75 degrees Fahrenheit) a double set thermostat may be employed. Desirable results have been achieved, especially for selectively circulating water between the reservoir 16 and the drinking basin 14 to prevent the freezing of water in the drinking basin 14 during low temperature conditions, wherein the temperature sensing assembly 110 is a Series A19 temperature control, single-pole, double throw model thermostat manufactured by Johnson Controls, Inc., 1302 East Monroe St., Goshen, Ind. 46526.

Referring now to FIG. 6, a second embodiment of a housing 12A of the improved livestock watering system 10 is illustrated. The housing 12A, which is substantially cylindrical in cross-section, is provided with an upper end portion 20A, a lower end portion 22A and a substantially continuous sidewall 24A. The upper end portion 20A of the housing 12A is adapted to receive and support the drinking basin 14 as heretofore described with reference to the housing 12 of FIGS. 1-5. The continuous sidewall 24A is inclined outwardly from the upper end portion 20A of the housing 12A to the lower end portion 22A of the housing 12A substantially as shown. A shoulder 26A is formed about the lower end portion 22A of the housing 12A so as to provide a means for anchoring the housing 12A in a stationary stable position within the ground. A layer of insulation material 120 is positioned on and secured to an interior surface 122 of the continuous sidewall 24A of the housing 12A Any suitable insulation material well known in the art can be employed as the insulation material 120, and the insulation material 120 can be secured to the interior surface 122 of the continuous sidewall 24A by conventional techniques well known in the insulation art.

Referring to FIG. 7, a second embodiment of a drinking basin 14A of the livestock watering system 10 is illustrated. The drinking basin 14A, an inverted, substantially frustum-shaped basin having a bottom member 34A, a sidewall 36A, an annular rim 38A and a lip 40A is substantially identical in construction to that of the drinking basin 14 heretofore described, with the exception of a heating element 124 which is disposed within the sidewall 36A of the drinking basin 14A. The heating element 124 can be any suitable heating element, such as a continuous heating tape, and is desirably formed in the sidewall 36A of the drinking basin 14A during fabrication. The heating element 124 is connected to an external electrical power source (not shown), preferably in series with a thermostat, such as the thermostat 112, via electrical lead wires 126 in a conventional manner so that when the temperature of the water in the drinking basin 14 reaches a selected determined temperature, as sensed by the temperature sensing element of the thermostat, the thermostat will activate the heating element 124 to warm the sidewall 36A of the drinking basin 14A, and thus the water in the drinking basin 14A. It should be understood that one may desire to also place a heating element in the bottom member 34A of the drinking basin 14A, especially when the livestock watering system is to be used in an extremely low temperature environment. In such instance, the heating element in the bottom member 34A of the drinking basin 14A will be connected to a thermostat in the same manner as the heating element 124. Further, a single thermostat, such as thermostat 112, may be used to activate the pump 80 and the heating element 124, or separate thermostats can be used to control the heating element 124 and the pump 80 so that the pump 80 and the heating element 124 are controlled independently of the other.

FIG. 8 illustrates yet another embodiment of a drinking basin 14B of the livestock watering system 10. The drinking basin 14B, also illustrated as an inverted, substantially frustum-shaped basin having a bottom member 34B, a sidewall 36B, an annular rim portion 38B and a lip 40B is substantially identical in construction to that of the drinking basin 14 heretofore described. The drinking basin 14B further includes a layer of insulation material 130 positioned around an external surface 132 of the drinking basin 14B formed by the bottom member 34B and the sidewall 36B. Thus, the combination of the insulation material 130 disposed about the drinking basin 14B, and the circulation of water between the reservoir 16 and the drinking basin 14B, prevents freezing of water in the drinking basin 14B when sub-freezing temperature conditions are encountered.

Referring now to FIGS. 1 and 3, the installation and operation of the livestock watering system 10 will be described. The livestock watering system 10 is located at a suitable site so that a source of pressurized water is available. A pit is then dug in the ground to a sufficient depth and size so that when the reservoir 16 is positioned within the pit and covered with soil, the reservoir 16 is positioned below the frost-line 74 of the ground. The housing 12, having the drinking basin 14 securely attached thereto, is positioned over the upwardly extending return flow conduit 76 and the water circulation conduit 78, respectively, and the end 60 of the pressurized water supply conduit 62. The shoulder 26 of the housing 12 is then buried below the surface 72 of the ground to stablize the housing 12. Thereafter, the end 60 of the pressurized water supply conduit 62 is connected to the stem 58 of the flow control valve 56 via the elbow connector 64; the water circulation conduit 78 is connected through the pump 80 to the first fluted recessed portion 42 of the drinking basin 14 via the elbow connector 108; and the return flow conduit 76 is connected to the second fluted recessed portion 44 of the drinking basin 14 via the Y-shaped coupling member 86. The drinking basin 14 and the reservoir 16 are then filled with water until a desired level of water is present in the drinking basin 14. The pump 80 is then connected in series with the thermostat 112 of the temperature sensing assembly 110 and to a power source (not shown). Thereafter, the thermostat 112 is manually set so as to activate the pump 80 when the water in the drinking basin 14 reaches a predetermined temperature as sensed by the temperature sensing probe or element 114 of the temperature sensing assembly 110. When the temperature of the water in the drinking basin 14 reaches a predetermined temperature, as sensed by the temperature sensing element 114, a signal is transmitted to the thermostat 112 so that the pump 80 is activated to the on mode. When the pump 80 is in the on mode water is circulated between the reservoir 16 and the drinking basin 14 via the water circulation asssembly 18 as heretofore described. When the water in the drinking basin 14 again reaches a predetermined temperature, as sensed by the temperature sensing element 114, the thermostat 112 causes the pump 80 to be switched to the off mode so that circulation of the water between the drinking basin 14 and the reservoir 16 is stopped.

When the level of the water in the drinking basin 14 is reduced, either by evaporation or by the water in the drinking basin 14 being consumed by an animal, the change in the level of the water in the drinking basin 14 is detected by a change of weight of the water upon the flow control valve 56. This change of weight of the water in the drinking basin 14 causes the flow control valve 56 to be positioned in an open mode so that water can be discharged into the drinking basin 14 via the pressurized water supply conduit 62 until the water in the drinking basin reaches a predetermined height, at which time the flow control valve 56 is placed in a closed mode so as to prevent further discharge of water into the drinking basin 14.

The improved livestock watering system 10 of the present invention can be fabricated of any suitable material. However, desirable results have been obtained wherein the housing 12, the drinking basin 14, and the reservoir 16 are fabricated of shock-proof, reinforced fiber glass materials so that the system is resistant to the formation of algae and will be capable of absorbing shock and force created by large animals, such as cattle and horses, bumping the housing 12.

It is clear that the present invention is well adapted to carry out the objects and attain the ends and advantages mentioned herein as well as those inherent in the invention. While presently preferred embodiments of the invention have been described for purposes of this disclosure, numerous changes may be made which will readily suggest themselves to those skilled in the art and which are accomplished within the spirit of the invention disclosed and as defined in the appended claims.

What is claimed is:

1. An improved livestock watering system comprising:
   a housing having an upper end portion, a lower end portion and a continuous sidewall;
   a drinking basin supported by the upper end portion of the housing;
   flow control valve means disposed within the drinking basin and in fluid communication with a pressurized water source for maintaining water in the drinking basin;
   a reservoir adapted to hold a supply of water;
   water circulation means connected to the drinking basin and the reservoir for circulating water therebetween; and
   temperature sensing means for sensing the temperature of the water in the drinking basin and for selectively activating the water circulation means to circulate water between the reservoir and the drinking basin in response to the temperature of the water in the drinking basin.

2. The improved livestock watering system of claim 1 wherein the water circulation means comprises:
   a return flow conduit having a first end and a second end, the first end of the return flow conduit connected to the drinking basin so as to be positioned in a lower portion thereof, the second end of the return flow conduit connected to an upper portion of the reservoir;
   a water circulation conduit having a first end and a second end, the first end of the water circulation conduit connected to the drinking basin, the second end of the water circulation conduit disposed in a lower portion of the reservoir; and
   a pump fluidly communicating with the water circulation conduit and operably connected to the temperature sensing means so that the pump is activated to one of an on mode and an off mode to selectively circulate water between the reservoir and the drinking basin in response to the temperature of the water in the drinking basin.

3. The improved livestock watering system of claim 2 wherein the temperature sensing means comprises:
   a thermostat having a temperature sensing probe, the temperature sensing probe supported within the drinking basin so as to be in contact with the water contained therein, the thermostat being supported within the housing and connected to the pump such that the thermostat selectively activates the pump in one of the on mode and the off mode in response to the temperature of the water in the drinking basin as sensed by the temperature sensing probe.

4. The improved livestock watering system of claim 1 wherein the drinking basin is characterized as a substantially inverted, frustum-shaped basin having a closed bottom member, a continuous sidewall and an annular rim formed along an upper portion of the sidewall, the basin further characterized as having at least one elongated, substantially vertically disposed fluted recessed portion formed in the sidewall of the basin.

5. The improved livestock watering system of claim 4 wherein the drinking basin is provided with a first fluted recessed portion extending from the annular rim of the basin to the bottom member thereof, and a spatially disposed second fluted recessed portion extending from the annular rim of the basin to the bottom member thereof, and wherein the flow control valve means is disposed within a lower portion of the first fluted recessed portion of the drinking basin.

6. The improved livestock waterinq system of claim 5 wherein the water circulation means comprises:
   a return flow conduit having a first end and a second end, the return flow conduit connecting the drinking basin to the reservoir so as to establish fluid communication therebetween, the first end of the return flow conduit extending into the second fluted recessed portion of the drinking basin a selected distance from the bottom of the second fluted recessed portion, the second end of the return flow conduit communicating with an upper portion of the reservoir such that water can be discharged from the drinking basin to the reservoir;
   a water circulation conduit having a first end and a second end, the water circulation conduit connecting the drinking basin to the reservoir so as to establish fluid communication therebetween, the first end of the water circulation conduit being disposed in the first fluted recessed portion of the drinking basin, the second end of the water circulation conduit communicating with a lower portion of the reservoir such that water can be selectively discharged from the reservoir to the drinking basin; and a pump having an on mode and an off mode interposed within the water circulation conduit and in fluid communication with the water circulation conduit, the pump operably connected to the temperature sensing assembly such that the pump is selectively activated to one of the on mode and the off mode in response to the temperature of the water in the drinking basin.

7. The improved livestock watering system of claim 6 further comprising:

nozzle means disposed within the first fluted recessed portion of the drinking basin and connected to the first end of the water circulation conduit for directing the discharge of the water into the basin and for increasing the velocity of water discharged into the drinking basin via the reservoir, the water circulation conduit and the pump.

8. The improved livestock watering system of claim 7 further comprising:

filter means for preventing debris contained in the water of the drinking basin from entering the reservoir via the return flow conduit when water is circulated between the drinking basin and the reservoir, the filter means being supported within the return flow conduit so as to be in close proximity to the first end thereof.

9. The improved livestock watering system of claim 8 further comprising:

connector means interposed within the return flow conduit for selectively directing the flow of water from the drinking basin along one of a first flow path and second flow path, the first flow path permitting water from the drinking basin to be circulated from the drinking basin to the reservoir, the second flow path permitting water from the drinking basin to be discharged from the system.

10. The improved livestock watering system of claim 9 wherein the housing is provided with an access opening formed in the sidewall thereof and wherein the housing further comprises:

a door assembly connected to the sidewall of the housing, the door assembly movable between a first position and a second position, in the first position the door assembly sealing the access opening and in the second position the door assembly permitting access to an interior portion of the housing via the access opening.

11. The improved livestock watering system of claim 10 further comprising:

shoulder means formed on the lower end portion of the housing for stablizing the housing in the ground with relation to the reservoir.

12. The improved livestock watering system of claim 10 further comprising:

insulation means disposed about an exterior side portion of the drinking basin for restricting heat loss from the water in the drinking basin.

13. The improved livestock watering system of claim 10 further comprising:

second insulation means disposed about an interior sidewall portion of the housing for insulating the return flow conduit, the water circulation conduit and the pump means.

14. The improved livestock watering system of claim 1 further comprising:

heating means supported by the drinking basin for selectively heating the water in the drinking basin, the heating means having an on mode and an off mode, the heating means operably connected to the temperature sensing means such that the heating means is selectively activated to one of the on mode and the off mode in response to the temperature of the water in the drinking basin.

15. The improved livestock watering system of claim 14 further comprising:

insulation means disposed about the drinking basin for restricting heat loss from the water in the drinking basin.

16. An improved livestock watering system comprising:

a housing having an upper end portion, a lower end portion, a continuous sidewall and a shoulder disposed about the lower end portion positionable within the ground to stablize the housing;

a substantially inverted, frustum-shaped drinking basin supported by the upper end portion of the housing;

flow control valve means disposed within a lower portion of the drinking basin and operably connected to a pressurized water source for maintaining a predetermined level of water in the drinking basin;

a reservoir positioned within the ground so as to be disposed below the frost-line thereof;

water circulation means fluidly connected to the drinking basin for circulating water therebetween; and temperature sensing means for sensing the temperature of the water in the drinking basin, the temperature sensing means operably connected to the water circulation system for selectively activating the water circulation means to circulate water between the reservoir and the drinking basin in response to the temperature of the water in the drinking basin.

17. The improved livestock watering system of claim 16 wherein the water circulation means comprises:

a return flow conduit having a first end and a second end, the first end of the return flow conduit connected to the drinking basin so as to be positioned in a lower portion thereof, the second end of the return flow conduit connected to an upper portion of the reservoir;

a water circulation conduit having a first end and a second end, the first end of the water circulation conduit connected to the drinking basin so as to be positioned in a medial portion thereof, the second end of the water circulation conduit disposed in a lower portion of the reservoir; and a pump having an on mode and an off mode, the pump fluidly communicating with the water circulation conduit and operably connected to the temperature sensing means so that the pump is activated to one of the on mode and the off mode to selectively circulate water between the reservoir and the drinking basin in response to the temperature of the water in the drinking basin.

18. The improved livestock watering system of claim 17 wherein the temperature sensing means comprises:

a thermostat having a temperature sensing probe, the temperature sensing probe supported within the drinking basin so as to be in contact with the water contained therein, the thermostat being supported within the housing and connected to the pump such that the thermostat selectively activates the pump in one of the on mode and the off mode in response to the temperature of the water in the drinking basin as sensed by the temperature sensing probe.

19. The improved livestock watering system of claim 18 wherein the drinking basin is characterized as having a closed bottom member, a continuous sidewall and an annular rim formed along an upper portion of the sidewall, and said drinking basin further comprises a first fluted recessed portion extending from the annular rim of the basin to the bottom member thereof, amd a spatially disposed second fluted recessed portion extending from the annular rim of the drinking basin to the bottom member thereof, and wherein the flow control valve means is disposed within a lower portion of the first recessed fluted portion of the drinking basin, the first end of the water circulation conduit is disposed with a medial portion of the first recessed fluted portion and the first end of the return flow conduit is disposed in the second recessed fluted portion.

20. The improved livestock watering system of claim 19 further comprising:
    filter means for preventing the debris contained in the water of the drinking basin from entering the reservoir via the return flow conduit when water is circulated between the drinking basin and the reservoir, the filter means being secured within the return flow conduit so as to be in close proximity to the first end thereof.

21. The improved livestock watering system of claim 19 further comprising:
    connector means interposed within the return flow conduit for selectively directing the flow of water from the drinking basin along one of a first and second flow path, the first flow path permitting water from the drinking basin to be discharged into the reservoir, the second flow path permitting water from the drinking basin to be discharged from the system.

22. The improved livestock watering system of claim 17 wherein the housing is provided with an access opening formed in the sidewall thereof, and wherein the housing further comprises:
    a door assembly connected to the sidewall of the housing, the door assembly movable between a first position and a second position, in the first position the door assembly sealing the access opening, in a second position the door assembly permitting access to an interior portion of the housing via the access opening.

23. The improved livestock watering system of claim 22 further comprising:
    nozzle means connected to the first end of the water circulation conduit for directing the discharge of the water into the basin and for increasing the velocity of water discharged into the drinking basin via the reservoir, the water circulation conduit and the pump.

24. The improved livestock watering system of claim 23 further comprising:
    insulation means disposed about the side portion of the drinking basin for restricting heat loss from the water in the drinking basin.

25. The improved livestock watering system of claim 24 further comprising:
    second insulation means disposed about an interior sidewall portion of the housing for insulating the return flow conduit, the water circulation conduit and the pump means.

26. The improved livestock watering system of claim 24 further comprising:
    heating means supported by the drinking basin for selectively heating the water in the drinking basin, the heating means having an on mode wherein heat is generated and an off mode, the heating means operably connected to the temperature sensing means such that the heating means is selectively activated to one of the on mode and the off mode in response to the temperature of the water in the drinking basin.

* * * * *